US012345156B2

(12) United States Patent
Jones et al.

(10) Patent No.: US 12,345,156 B2
(45) Date of Patent: Jul. 1, 2025

(54) OPTICAL DETECTION OF ION WATER CHEMISTRY IN OIL AND WATER

(71) Applicant: Halliburton Energy Services, Inc., Houston, TX (US)

(72) Inventors: Christopher Michael Jones, Houston, TX (US); James Martin Price, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 19 days.

(21) Appl. No.: 18/243,002

(22) Filed: Sep. 6, 2023

(65) Prior Publication Data
US 2024/0280018 A1 Aug. 22, 2024

Related U.S. Application Data

(60) Provisional application No. 63/447,272, filed on Feb. 21, 2023.

(51) Int. Cl.
| | |
|---|---|
| *E21B 49/10* | (2006.01) |
| *E21B 49/08* | (2006.01) |
| *G01N 21/01* | (2006.01) |
| *G01N 21/05* | (2006.01) |
| *G01N 21/78* | (2006.01) |

(52) U.S. Cl.
CPC .......... *E21B 49/10* (2013.01); *E21B 49/0875* (2020.05); *G01N 21/01* (2013.01); *G01N 21/05* (2013.01); *G01N 21/78* (2013.01)

(58) Field of Classification Search
CPC ..... E21B 49/10; E21B 49/0875; G01N 21/01; G01N 21/05; G01N 21/78
See application file for complete search history.

(56) References Cited

U.S. PATENT DOCUMENTS

| | | |
|---|---|---|
| 9,599,554 B2 | 3/2017 | Price et al. |
| 10,234,593 B2 | 3/2019 | Price et al. |
| 10,260,946 B2 | 4/2019 | Price et al. |

(Continued)

FOREIGN PATENT DOCUMENTS

CN 111879714 A 11/2020

OTHER PUBLICATIONS

International Search Report and Written Opinion for International Patent Application No. PCT/US2023/033128 dated Jan. 8, 2024. PDF file. 10 pages.

*Primary Examiner* — Tarun Sinha
(74) *Attorney, Agent, or Firm* — John Wustenberg; C. Tumey Law Group PLLC (57) ABSTRACT

Systems and methods of separating multiphase flows in a flowline of a downhole fluid sampling and analysis tool, measuring target ions in the water phase, and separating between formation water and injection water are described. The system to separate the multiphase flows includes a three-dimensional barrier permeable to water and repelling oil and/or drilling mud filtrate into at least one bypass channel within the flowline of the downhole fluid sampling and analysis tool. For instance, the system to measure the targeted ions includes the system to separate the multiphase flows and an optical sensor, wherein the three-dimensional barrier has an aperture inside the three-dimensional barrier to let a light from an optical sensor go through perpendicular to the flowline.

19 Claims, 5 Drawing Sheets

(56) References Cited

U.S. PATENT DOCUMENTS

| | | |
|---|---|---|
| 10,724,355 B2 | 7/2020 | Jones et al. |
| 11,021,951 B2 | 6/2021 | Olapade et al. |
| 11,352,884 B2 | 6/2022 | Golovko et al. |
| 11,449,462 B2 | 9/2022 | Chen et al. |
| 11,459,881 B2 | 10/2022 | Li et al. |
| 11,499,900 B2 | 11/2022 | LeBlanc et al. |
| 11,506,051 B2 | 11/2022 | Olapade et al. |
| 11,592,433 B2 | 2/2023 | Khan et al. |
| 11,643,928 B2 | 5/2023 | Jones et al. |
| 11,719,096 B2 | 8/2023 | Olapade et al. |
| 2004/0045350 A1* | 3/2004 | Jones .................. E21B 49/10 |
| | | 73/152.23 |
| 2012/0285680 A1 | 11/2012 | Kumar |
| 2014/0342467 A1* | 11/2014 | Kim .................. G01N 21/6428 |
| | | 422/69 |
| 2017/0176324 A1 | 6/2017 | Perkins et al. |
| 2017/0268926 A1 | 9/2017 | Price et al. |
| 2018/0120469 A1* | 5/2018 | Monteiro .............. E21B 47/10 |
| 2021/0239000 A1 | 8/2021 | Olapade et al. |
| 2021/0293144 A1* | 9/2021 | Al-Malki .............. E21B 10/10 |
| 2021/0372279 A1 | 12/2021 | Li et al. |
| 2023/0106930 A1 | 4/2023 | Olapade et al. |

\* cited by examiner

OPTICAL DETECTION OF ION WATER CHEMISTRY IN OIL AND WATER

CROSS REFERENCE TO RELATED APPLICATIONS

This application claims the priority of U.S. Provisional Patent Application No. 63/447,272, filed Feb. 21, 2023, which is incorporated by reference in its entirety.

Wells may be drilled at various depths to access and produce oil, gas, minerals, and other naturally occurring deposits from subterranean geological formations. The drilling of a well is typically accomplished with a drill bit that is rotated within the well to advance the well by removing topsoil, sand, clay, limestone, calcites, dolomites, or other materials.

During or after drilling operations, sampling operations may be performed to collect a representative sample of formation or reservoir fluids (e.g., hydrocarbons) to further evaluate drilling operations and production potential, or to detect the presence of certain gases or other materials in the formation that may affect well performance.

During sampling operations, an optical measurement may be performed on a fluid sample collected during sampling operations. Such optical measurements may utilize an ionophore embedded in a three-dimensional barrier that may change color as the pH or other ions diffuse into the barrier from the fluid sample. This change in color may then be detected by an optical measurement device. However, if not designed and engineered correctly, the ionophore embedded barrier may be susceptible to fouling, degradation under harsh environmental conditions, and/or extend the diffusion time of ions longer than desired. These issues may extend optical measurement time and create unreliable optical measurement results.

BRIEF DESCRIPTION OF THE DRAWINGS

The features and advantages of certain examples will be more readily appreciated when considered in conjunction with the accompanying figures. The figures are not to be construed as limiting any of the preferred examples.

DETAILED DESCRIPTION

The present disclosure relates to methods and systems for a cartridge device to separate multiphase flows comprising oil and water, measure ions in the water phase in an oilfield well, and differentiate formation water from injection water. The cartridge device may be hydrophilic, oleophobic, high temperature and high pressure (HTHP) resilient, optically transparent, and promote fast ion diffusion. The cartridge repels the oil phase into bypass channels while permeable to the water phase. The cartridge may house a three-dimensional barrier such as a polymeric host material embedded with an ionophore that changes color upon complexation with one or more target ions. The polymeric host material may be a hydrogel, for example. Chromoionophores, or colored ionophores, wherein a chromophore structure and an ionophore structure are combined, may be embedded within the three-dimensional barrier of the cartridge device. The three-dimensional barrier prevents oil from penetrating the barrier but allows water to permeate through. The three-dimensional barrier may be macroporous, mesoporous, microporous, or a dense thin film. For example, the chromoionophores may be embedded within a dense polymeric thin film. The cartridge device may be polymeric, ceramic, metallic, or any combination thereof. The cartridge device may comprise a polymeric three-dimensional barrier comprising an ionophore that binds to a target ion to stimulate a response. A concentration gradient of ionophore-target ion will be created throughout the three-dimensional barrier that will promote diffusion.

The target ions may react with the chromophore to form an ion-chromophore complex and this complex changes the spectral characteristics of the cartridge device. The cartridge device has an aperture inside the three-dimensional barrier to let a spectrometer light go through perpendicular to the flowline. As the concentration of the target ions increases inside the cartridge device, the optical characteristic of the cartridge device changes, and the changes are monitored with an optical sensor. The three-dimensional barrier may be sandwiched in between mechanical supports to prevent degradation from abrasive flow conditions and withstand the high pressure and high temperature typically found in a downhole fluid sampling and analysis tool, such as 35 kpsi and 300° C. The mechanical support may be metallic, ceramic, polymeric or any combination thereof. Additionally, the cartridge device may be removable, reusable, and/or disposable. These features may allow for reliable optical measurements that are also fast and usable in a downhole environment.

Figure 1:
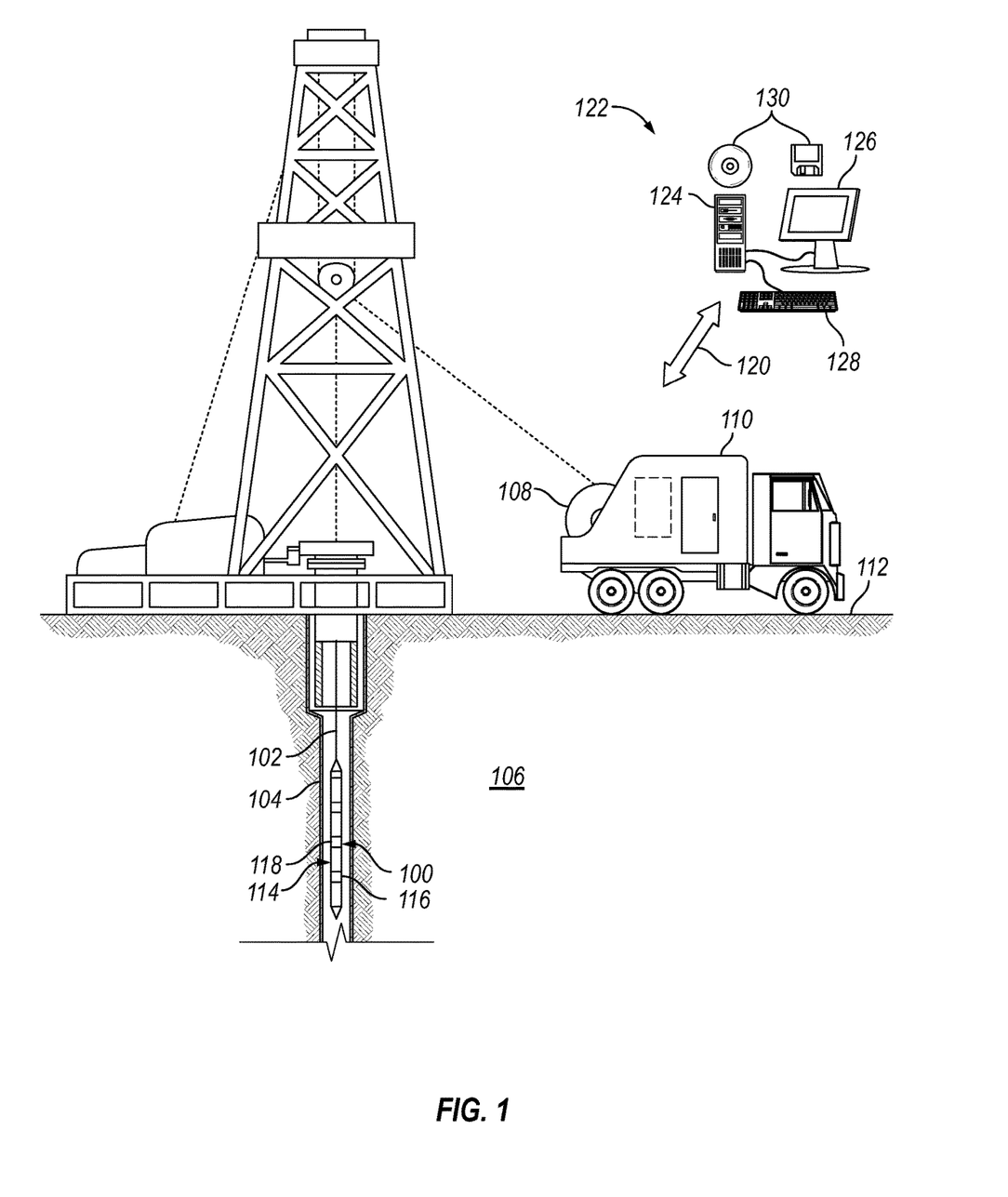
FIG. 1 illustrates a schematic view of a well in which an example embodiment of a fluid sample system is deployed.

FIG. 1 is a schematic diagram of fluid sampling tool 100 on a conveyance 102. As illustrated, wellbore 104 may extend through subterranean formation 106. In examples, reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible.

As illustrated, a hoist 108 may be used to run fluid sampling tool 100 into wellbore 104. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Fluid sampling tool 100 may be suspended in wellbore 104 on conveyance 102. Other conveyance types may be used for conveying fluid sampling tool 100 into wellbore 104, including coiled tubing and wired drill pipe, for example. Fluid sampling tool 100 may comprise a tool body 114, which may be elongated as shown on FIG. 1. Tool body 114 may be any suitable material, including without limitation titanium, stainless steel, alloys, plastic, combinations thereof, and the like. Fluid sampling tool 100 may further include one or more sensors 116 for measuring properties of the fluid sample, reservoir fluid, wellbore 104, subterranean formation 106, or the like. In examples, fluid sampling tool 100 may also include a fluid analysis module 118, which may be operable to process information regarding a fluid sample, as described below. The fluid sampling tool 100 may be used to collect fluid samples from subterranean formation 106 and may obtain and separately store different fluid samples from subterranean formation 106.

In examples, fluid analysis module 118 may comprise at least one sensor that may continuously monitor a fluid such as a reservoir fluid, formation fluid, wellbore fluid, or nonnative formation fluid (e.g., drilling fluid filtrate). Such monitoring may take place in a fluid flow line or a formation tester probe, such as in a pad or packer. Alternatively, continuous monitoring of fluid may include making measurements to investigating the formation, for example, by making measuring a local formation property with a sensor. Sensors may include, without limitation, optical sensors, acoustic sensors, electromagnetic sensors, conductivity sensors, resistivity sensors, selective electrodes, impedance sensors, density sensors, mass sensors, analyte sensors, thermal sensors, chromatography sensors, viscosity sensors, fluid rheology sensors, bubble point sensors, fluid compressibility sensors, flow rate sensors, pressure sensors, nuclear magnetic resonance (NMR) sensors. Sensors may measure a contrast between drilling fluid filtrate properties and formation fluid properties. Fluid analysis module 118 may be operable to derive properties and characterize the fluid sample. By way of example, fluid analysis module 118 may measure absorption, transmittance, fluorescence, or reflectance spectra, and translate these measurements into, for example, component concentrations (or ion activity) of the fluid sample, which may be lumped component concentrations, as described above. The fluid analysis module 118 may also measure gas-to-oil ratio, fluid composition, water cut, live fluid density, live fluid viscosity, formation pressure, formation temperature and/or fluid composition. Fluid analysis module 118 may also be operable to determine fluid contamination of the fluid sample and may include any instrumentality or aggregate of instrumentalities operable to compute, classify, process, transmit, receive, retrieve, originate, switch, store, display, manifest, detect, record, reproduce, handle, invert, or utilize any form of information, intelligence, or data for business, scientific, control, or other purposes. The absorption, transmittance, or reflectance spectra absorption, transmittance, or reflectance spectra may be measured with sensors 116 by way of standard operations. For example, fluid analysis module 118 may include random access memory (RAM), one or more processing units, such as a central processing unit (CPU), or hardware or software control logic, ROM, and/or other types of nonvolatile memory. Fluid analysis module 118 and fluid sampling tool 100 may be communicatively coupled via communication link 120 with information handling system 122.

Any suitable technique may be used for transmitting signals from the fluid sampling tool 100 to the surface 112. As illustrated, a communication link 120 (which may be wired or wireless, for example) may be provided that may transmit data from fluid sampling tool 100 to an information handling system 122 at surface 112. Information handling system 122 may include a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from fluid sampling tool 100. For example, information handling system 122 may process the information from fluid sampling tool 100 for determination of fluid contamination. The information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole hole or at surface 112 or another location after recovery of fluid sampling tool 100 from wellbore 104. Alternatively, the processing may be performed by an information handling system in wellbore 104, such as fluid analysis module 118. The resultant fluid contamination and fluid properties may then be transmitted to surface 112, for example, in real-time.

Figure 2:
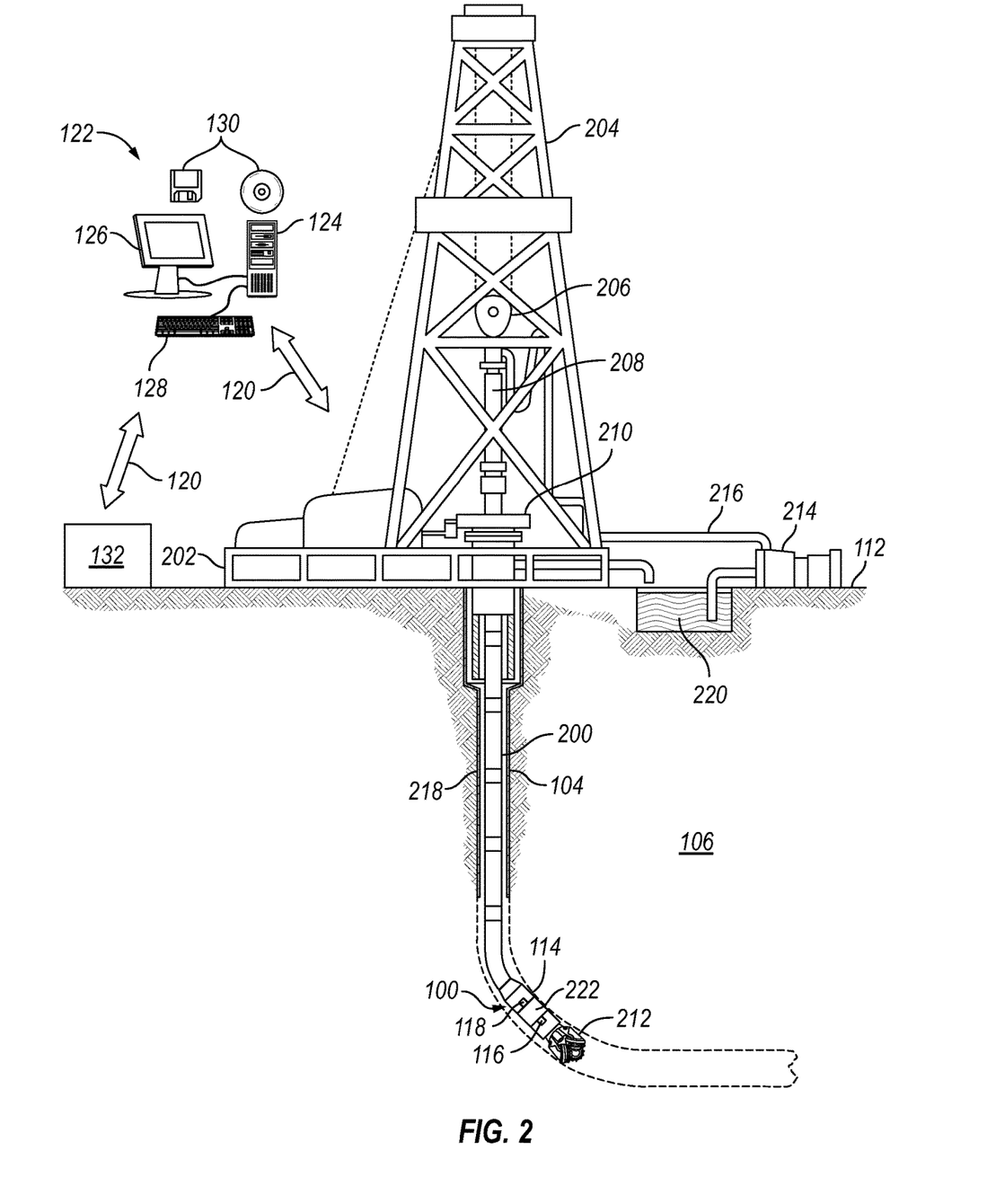
FIG. 2 illustrates a schematic view of another well in which an example embodiment of a fluid sample system is deployed.

Referring now to FIG. 2, a schematic diagram of fluid sampling tool 100 disposed on a drill string 200 in a drilling operation. Fluid sampling tool 100 may be used to obtain a fluid sample, for example, a fluid sample of a reservoir fluid from subterranean formation 106. The reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106.

As illustrated, a drilling platform 202 may support a derrick 204 having a traveling block 206 for raising and lowering drill string 200. Drill string 200 may include, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may include, roller cone bits, PDC bits, natural diamond bits, any hole openers, reamers, coring bits, and the like. As drill bit 212 rotates, it may create and extend wellbore 104 that penetrates various subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may include one or more drill collars 222 and fluid sampling tool 100. Fluid sampling tool 100, which may be built into the drill collars 222 may gather measurements and fluid samples as described herein. One or more of the drill collars 222 may form a tool body 114, which may be elongated as shown on FIG. 2. Fluid sampling tool 100 may be similar in configuration and operation to fluid sampling tool 100 shown on FIG. 1 except that FIG. 2 shows fluid sampling tool 100 disposed on drill string 200. Alternatively, the sampling tool may be lowered into the wellbore after drilling operations on a wireline.

Fluid sampling tool 100 may further include one or more sensors 116 for measuring properties of the fluid sample reservoir fluid, wellbore 104, subterranean formation 106, or the like. The one or more sensors 116 may be disposed within fluid analysis module 118. In examples, more than one fluid analysis module may be disposed on drill string 200. The properties of the fluid are measured as the fluid passes from the formation through the tool and into either the wellbore or a sample container. As fluid is flushed in the near wellbore region by the mechanical pump, the fluid that passes through the tool generally reduces in drilling fluid filtrate content, and generally increases in formation fluid content. The fluid sampling tool 100 may be used to collect a fluid sample from subterranean formation 106 when the filtrate content has been determined to be sufficiently low. Sufficiently low depends on the purpose of sampling. For some laboratory testing, below 10% drilling fluid contamination is sufficiently low, and for other testing, below 1% drilling fluid filtrate contamination is sufficiently low. Sufficiently low also depends on the nature of the formation fluid such that lower requirements are generally needed, for example, for formation fluids having lighter oils as designated by a higher gas-to-oil (GOR) ratio or a higher American Petroleum Institute (API) gravity. Sufficiently low also depends on the rate of cleanup in a cost benefit analysis since longer pumpout times required to incrementally reduce the contamination levels may have prohibitively large costs. As previously described, the fluid sample may comprise a reservoir fluid, which may be contaminated with a drilling fluid, drilling fluid filtrate, another contaminant, or a combination thereof. Fluid sampling tool 100 may obtain and separately store different fluid samples from subterranean formation 106 with fluid analysis module 118. Fluid analysis module 118 may operate and function in the same manner as described above. However, storing of the fluid samples in the fluid sampling tool 100 may be based on the determination of the fluid contamination. For example, if the fluid contamination exceeds a tolerance, then the fluid sample may not be stored. If the fluid contamination is within a tolerance, then the fluid sample may be stored in the fluid sampling tool 100. In examples, contamination may be defined within fluid analysis module 118.

Figure 3:
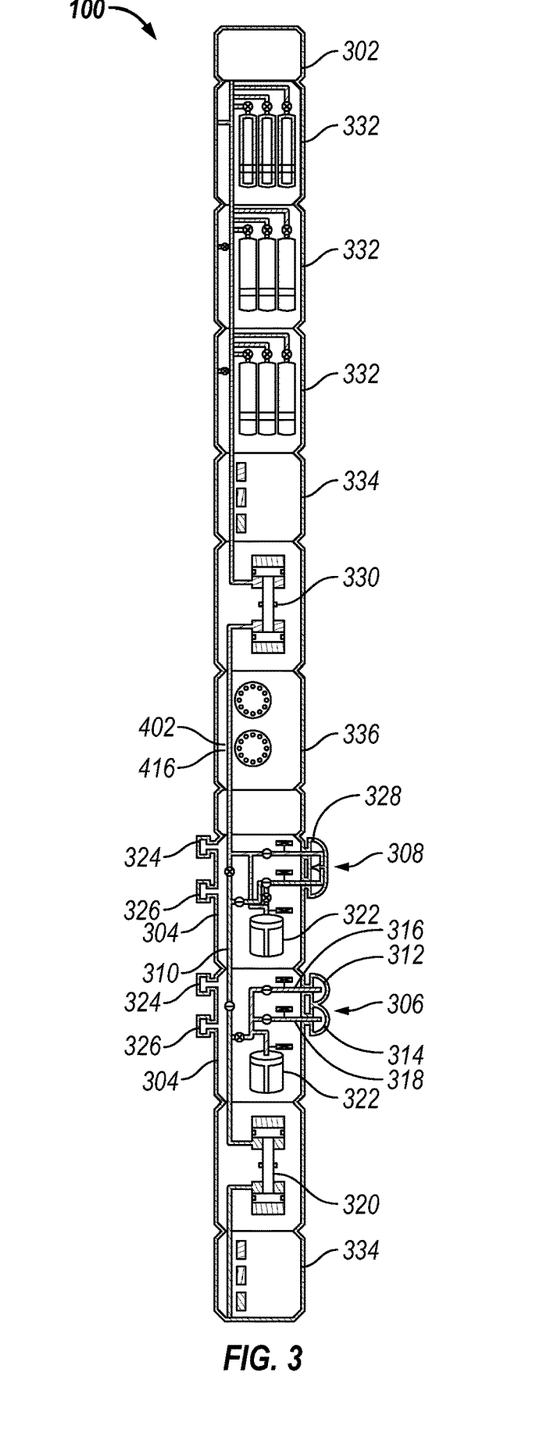
FIG. 3 illustrates a schematic of a fluid sampling tool.

FIG. 3 illustrates a schematic of fluid sampling tool 100. As illustrated, fluid sampling tool 100 includes a power telemetry section 302 through which fluid sampling tool 100 may communicate with other actuators and sensors in a conveyance (e.g., conveyance 102 on FIG. 1 or drill string 200 on FIG. 2), and/or the conveyance's communications system, such as information handling system 122 (e.g., referring to FIG. 1). In examples, power telemetry section 302 may also be a port through which the various actuators (e.g., valves) and sensors (e.g., temperature and pressure sensors) in fluid sampling tool 100 may be controlled and monitored. In examples, power telemetry section 302 may comprise an additional information handling system 122 (not illustrated) that exercises the control and monitoring function. In one example, the control and monitoring function is performed by an information handling system 122 (e.g., referring to FIGS. 1 and 2) in another part of the drill string or fluid sampling tool 100 (not shown) or by an information handling system at surface 112.

Information from fluid sampling tool 100 may be gathered and/or processed by the information handling system 122. The processing may be performed real-time during data acquisition or after recovery of fluid sampling tool 100. Processing may alternatively occur downhole or may occur both downhole and at surface 112. In some examples, signals recorded by fluid sampling tool 100 may be conducted to information handling system by way of conveyance. Information handling system may process the signals, and the information contained therein may be displayed for an operator to observe and stored for future processing and reference. Information handling system may also contain an apparatus for supplying control signals and power to fluid sampling tool 100.

In examples, fluid sampling tool 100 may include one or more enhanced probe sections 304 and stabilizers 324. Each enhanced probe section may include a dual probe section 306 or a focus sampling probe section 308. Both of which may extract fluid from the reservoir and deliver said fluid to a flow line 310 that extends from one end of fluid sampling tool 100 to the other. Without limitation, dual probe section 306 includes two probes 312, 314 which may extend from fluid sampling tool 100 and press against the inner wall of wellbore 104 (e.g., referring to FIG. 1). Probe flow lines 316 and 318 may connect probe 312, 314 to flow line 310 and allow for continuous fluid flow from the subterranean formation 106 to flow line 310. A high-volume bidirectional pump 320 may be used to pump fluids from the formation, through probe flow lines 316, 318 and to flow line 310. Alternatively, a low volume pump bidirectional piston 322 may be used to remove reservoir fluid from the reservoir and house them for asphaltene measurements, discussed below. Two standoffs or stabilizers 324, 326 hold fluid sampling tool 100 in place as probes 312, 314 press against the wall of wellbore 104. In examples, probes 312, 314 and stabilizers 324, 326 may be retracted when fluid sampling tool 100 may be in motion and probes 312, 314 and stabilizers 324, 326 may be extended to sample the formation fluids at any suitable location in wellbore 104. As illustrated, probes 312, 314 may be replaced, or used in conjunction with, focus sampling probe section 308. Focus sampling probe section 308 may operate and function as discussed above for probes 312, 314 but with a single probe 328. Other probe examples may include, but are not limited to, oval probes, packers, or circumferential probes.

In examples, flow line 310 may connect other parts and sections of fluid sampling tool 100 to each other. For example, fluid sampling tool 100 may include a second high-volume bidirectional pump 330 for pumping fluid through flow line 310 to one or more multi-chamber sections 332, one or more side fluid density modules 334, and/or one or more dynamic subsurface optical measurement tools 336.

Figure 4:
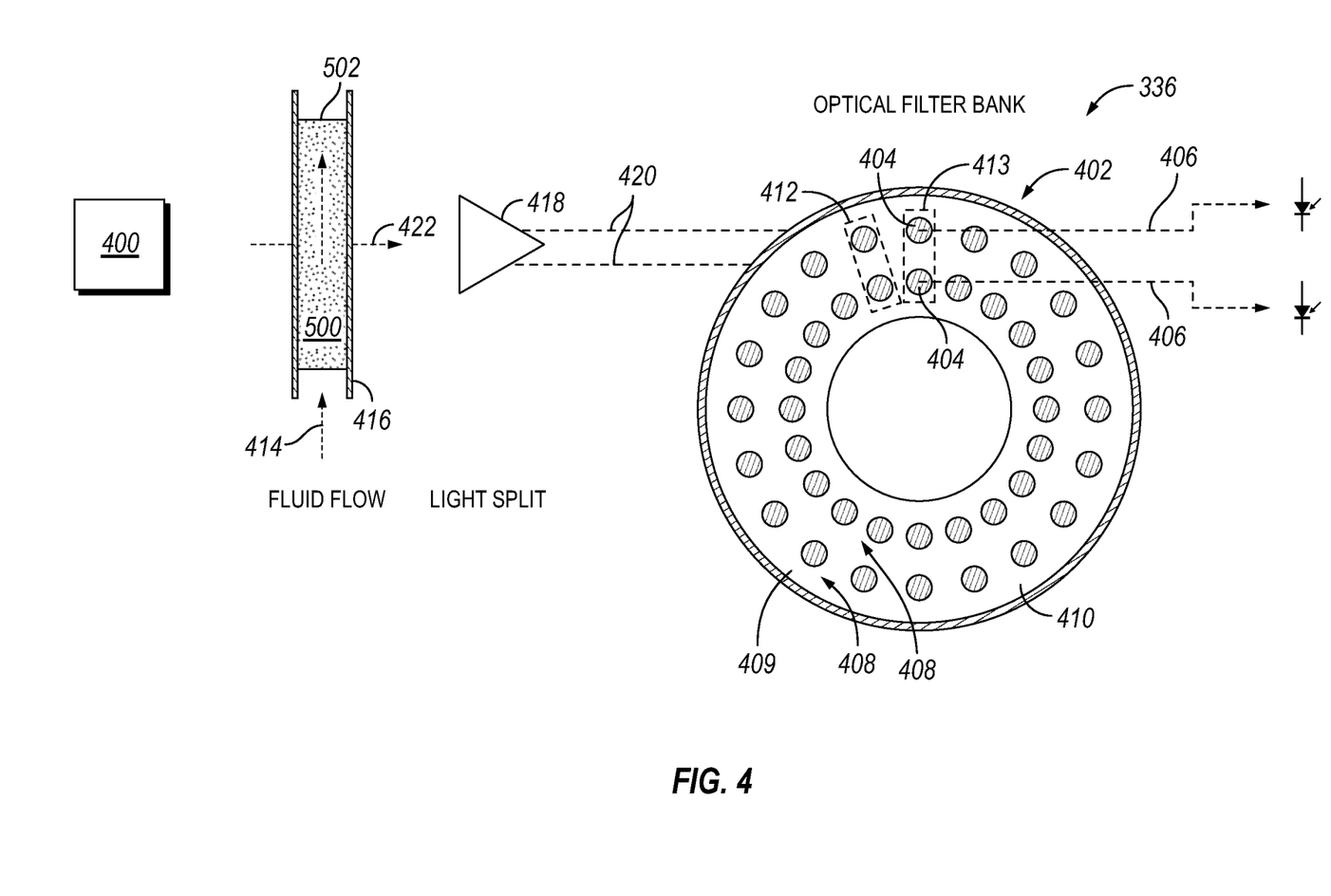
FIG. 4 illustrates a hardware configuration of a dynamic subsurface optical measurement tool.

FIG. 4 depicts a hardware configuration of a dynamic subsurface optical measurement tool 336. It should be noted that a channel, disclosed herein, may be a measurement of the light transmittance through an optical filter. Optical measurement tool 336 may include a light source 400, a filter bank 402 comprising a plurality of optical filters 404 (measurement of the light transmittance through an optical filter is called a channel 406) configured as two rings 408 on optical plate 410, within a channel pair 412 on each azimuth. It should be noted that each channel 406 may be designed, based on the construction of each channel-respective optical filter 406, to measure different properties of fluid sample 414. During the rotation of optical plate 410, the two optical filters 404 on a channel pair 412 may be synchronized spatially or in time to measure substantially the same fluid sample 414 in glass tube 416. Glass tube 416 may be disposed within and/or is a part of flow line 310 (e.g., referring to FIG. 3). As discussed below, and illustrated in FIG. 4, an active channel pair 413 is a channel pair 412 in which optical measurements are being taken to form one or more channels 406. In some examples, channel pairs 412 may be near synchronized such that channel pairs 412 have a sufficient probability of observing the same phase, i.e., better than 10%, but more desirably, more than 50%, and yet more desirably, more than 80%. In other examples, more than two channels 406 may be sufficiently synchronized according to a desired probability of observing a single phase in time or space. A velocity calculation of the fluid phase specific velocities may be used to aid synchronization over longer distances, or time. Alternatively, distribution calculations, or autocorrelation calculations may be used to improve the synchronization over longer distances or time. If the channels are sufficiently close in distance or time, the channel signals may not need additional efforts of synchronization. During measurement, fluid samples 414 (which is formation fluid from passageway 306) may flow through a viewing region as a non-limiting example constructed by a set of windows or other transparent/semi-transparent region of the flow path. Alternatively, the viewing region or viewing area might not be transparent to visible light but rather to the form of energy used to measure the fluid characteristics for a given sensor. As such a viewing region or area for an acoustic sensor would ideally have a low acoustic impedance even if it is not transparent to visible light. Alternatively, the viewing region or area may be transparent (i.e., pass energy with low attenuation) to infrared light, or magnetic fields instead of visible light. In some examples for some sensors, the viewing region 409 or area is more generally a measurement region 409 or area as is the case with some phase behavior sensors or some density sensors. In examples, viewing region 409 may be at least a part of passageway 306 and/or a branch off of passageway 306). In one nonlimiting example, light 418 absorbed by fluid sample 414 may be split into at least two ray paths 420. Split light rays 420 may be measured by detectors, not shown, as they pass through channel pair 412 separately. Filter bank 402 may rotate to another channel pair 412 after the measurement of each channel 406 from channel pair 412 and may dynamically gather an optical spectra measurement of all channels after a full sampling channel rotation. It should be noted, the methods disclosed herein may not be limited in simultaneous measurements of a channel pair 412 (two optical filters 404 and their respective channel 406) but may also apply to cases with one or more optical filters 404 or filter banks 402, at least one channel 406, or, alternatively, two or more channels 406. Mixed sensor types may also be utilized such as but not limited to a density channel with an optical channel.

Generally, in conventional interpretations of optical analysis, fluid sample 414 may keep a consistent or same fluid phase during each of a ten-second measurement circle. Fluid sample 414 may comprise a mixture of hydrocarbons and water, gas, or solids, especially in the case of water-based-mud), and also in transition zone sampling or sampling below the saturation pressure of a liquid for which gas evolves. Generally, fluid sample 414 may flow through flow path 422 of light 418 and into an active channel pair 413 instead of or may rest for a static measurement. Optical measurement tool 336 may further be utilized to measure the ion concentration and pH of fluid sample 414. To perform this measurement, a three-dimensional barrier containing ionophores 500 may be inserted into glass tube 416 and flow path 422. In examples, three-dimensional barrier containing ionophores 500 (referring now to FIG. 5) may be hydrophilic, oleophobic, and/or ion-permeable. Three-dimensional barrier containing ionophores 500 may comprise an ionophore disposed within three-dimensional barrier containing ionophores 500 that may accelerate diffusion of the target ions into three-dimensional barrier containing ionophores 500. The target ions may bind to a color indicator. The change in color may be detected utilizing filter bank 402. In examples, three-dimensional barrier containing ionophores 500 may be disposed within glass tube 416 utilizing a cartridge 502.

Figure 5:
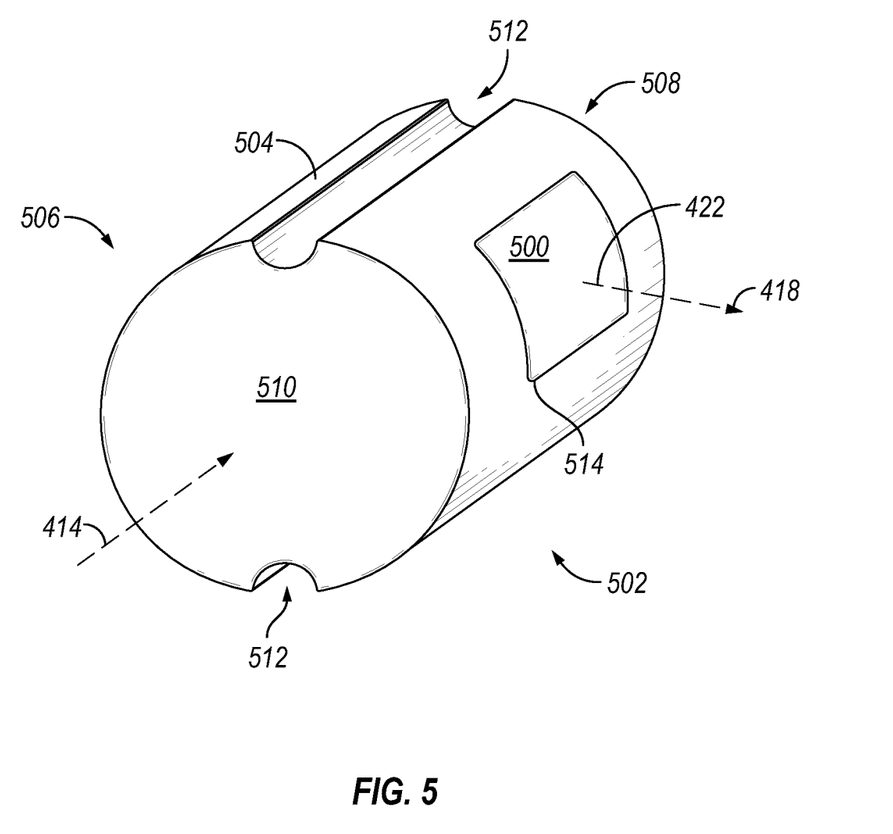
FIG. 5 illustrates an example of a cartridge.

FIG. 5 illustrates cartridge 502. Cartridge 502 may be disposed and may further be formed to allow for quick insertion and removal of cartridge 502 in and out of glass tube 416 (referring to FIG. 4). Cartridge 502 may comprise three-dimensional barrier containing ionophores 500 made from ceramic, polymer, metal, or a combination thereof. Three-dimensional barrier containing ionophores 500 may be any inorganic materials such as alumina, titania, zirconia oxide, zeolites, silicon carbide, for example. Three-dimensional barrier containing ionophores 500 may be made from any fluorinated compound such as polyvinylidene fluoride and polytetrafluoroethylene, any ether such as polyether ether ketone, any cellulose such as cellulose acetate, any nitrile such as polyacrylonitrile, any imide such as polyimide, any silicon such as polydimethylsiloxane, any polyvinylpyrrolidone, any polyethylene or polypropylene, or any combination thereof. Three-dimensional barrier containing ionophores 500 may be any hybrid material, wherein a porous metal is functionalized to render the porous barrier hydrophilic and oleophobic to promote water wettability and prevent oil from penetrating inside the cartridge for instance. The role of three-dimensional barrier containing ionophores 500 is to protect the color indicator of the target ions from the oil pumped inside the flow line, let the target ions from the water inside the flow line permeate through the barrier quickly binding to the ionophore, and prevent the color indicator from being released in the flow line. The color indicator may be contained inside a hydrogel and the hydrogel is also protected from the flow line by three-dimensional barrier containing ionophores 500. Three-dimensional barrier containing ionophores 500 seals optical path of light 418 from the flow line and prevents oil from penetrating inside optical path of light 418. Three-dimensional barrier containing ionophores 500 seals optical path of light 418 by contacting a sapphire window that lets light of the optical sensor goes through for instance.

In examples, cartridge 502 may be a cylindrical ceramic filter that may be from about 1 millimeter to about 50 millimeters, from about 2 millimeters to about 25 millimeters, or from about 2 millimeters to about 10 millimeters in length but may be any suitable length to allow for diffusion of fluid sample 414 into three-dimensional barrier containing ionophores 500 that may be disposed in cartridge 502. Additionally, cartridge 502 may be from about 1 millimeter to about 50 millimeters, or from about 2 millimeters to about 25 millimeters, in diameter. It should be noted, the diameter of cartridge 502 may be any suitable diameter to allow cartridge 502 to be disposed within glass tube 416 (referring to FIG. 4). Cartridge 502 may comprise an outer shell 504 that may be formed of ceramic, metallic, polymeric material, or any combination thereof (referring now to FIG. 5). Outer shell 504 may be utilized to house three-dimensional barrier containing ionophores 500. In examples, cartridge 502 may or may not be a onetime use device that is disposable. However, cartridge 502 may be re-useable and three-dimensional barrier containing ionophores 500 may be disposable. For example, cartridge 502 may be removed, three-dimensional barrier containing ionophores 500 removed from cartridge 502 and a virgin three-dimensional barrier containing ionophores 500 may be placed within cartridge 502. The virgin three-dimensional barrier containing ionophores 500 within cartridge 502 may then be placed within glass tube 416 for a measurement operation. Cartridge 502 may be disposed and held within glass tube 416 by any suitable attachment devices and/or methods. Although not illustrated, outer shell 504 may comprise one or more keyed slots that may mate with an opposite pair disposed within glass tube 416. These may operate and/or function to act as a friction connection and/or mechanical connection to attach cartridge 502 to glass tube 416 and prevent lateral and/or rotational movement of cartridge 502 within glass tube 416.

With continued reference to FIG. 5, cartridge 502 may have a first end 506 and a second end 508. In examples, first end 506 and second end 508 may be exposed to fluid sample 414 and both first end 506 and second end 508 may allow fluid sample 414 to traverse through three-dimensional dimensional barrier containing ionophores 500, housed in cartridge 502. Both first end 506 and/or second end 508 may comprise a screen 510, which may be utilized to filter fluid sample 414 and allow a water component of fluid sample 414 to pass the three-dimensional barrier containing ionophores 500 and force particles as well as oil components of fluid sample 414 through one or more by-pass channels 512. In examples, by-pass channels 512 are oriented in glass tube 416 so as not to be in line with flow path 422 of light 418 as the outer shell 504 or cartridge 502 would interfere with the transmission of light along flow path 422. To allow for flow path 422 to pass through three-dimensional barrier containing ionophores 500 without interference, at least one void 514 may be disposed within cartridge 502 to allow for light 418 to pass along flow path 422 through three-dimensional barrier containing ionophores 500 to filter bank 402 (e.g., referring to FIG. 4). This may allow for light 418, which may be altered or unaltered to be analyzed to determine the properties of fluid sample 414 that may have permeated three-dimensional barrier containing ionophores 500. Void 514 may be from about 1 millimeter to about 50 millimeters or from about 2 millimeters to about 25 millimeters in diameter. Void 514 may be from about 1 millimeter to about 25 millimeters or from about 1 millimeter to about 5 millimeters in length. Void 514 may have an optimized surface to volume ratio.

During measurement operations, fluid sample 414 may flow and permeate three-dimensional barrier containing ionophores 500. As discussed above, oil and/or particles within fluid sample 414 may be separated from water and guided around cartridge 502 using by-pass channels 512. In examples, three-dimensional barrier containing ionophores 500 may be hydrophilic, oleophobic, ion-permeable, and/or the like to further help in the separation of oil from water in fluid sample 414. Additionally, screen 510 and outer shell 504 may be coated with a hydrophilic and/or oleophobic self-assembled monolayer material to promote water wettability and prohibit the passage of oil inside three-dimensional barrier containing ionophores 500. Three-dimensional barrier containing ionophores 500 may be macroporous, mesoporous, microporous, or a dense thin film. Three-dimensional barrier containing ionophores 500 may comprise an ionophore that changes color upon complexation with one or more target ions. For example, three-dimensional barrier containing ionophores 500 may be a dense polymeric thin film embedded with chromoionophores. The target ions may react with the chromophore to form an ion-chromophore complex and this complex changes the spectral characteristics of the cartridge device. As the concentration of the target ions increases inside three-dimensional barrier containing ionophores 500, the optical characteristics of light 418 (e.g., referring to FIG. 4) will be altered as it passes along flow path 422 through three-dimensional barrier containing ionophores 500 to filter bank 402. Altered or unaltered light 418 will be analyzed to determine the properties of fluid sample 414 that may have permeated three-dimensional barrier containing ionophores 500. Properties of three-dimensional barrier containing ionophores 500 may be chosen to index match to water.

Diffusion through a three-dimensional liquid barrier can be slow. As the target ion traverses through the barrier, the ion diffusion time may be proportional to the square over diffusion length. Therefore, even a small diffusion length of about one micron may take a reaction time of about one second. However, this may take too long to register a change in color. Ionophores are chemical compounds that reversibly bind and transport ions through biological membranes in the absence of a protein pore. This can disrupt the membrane potential, and thus ionophores modify the permeability of biological membranes toward certain ions to which they show affinity and selectivity. Many ionophores are lipid-soluble across hydrophobic membranes, such as lipid bilayers found in living cells or synthetic vesicles, or liquid polymeric membranes. Structurally, an ionophore contains a hydrophilic center and a hydrophobic portion that interacts with the membrane. Ions are bound to the hydrophilic center and form an ionophore-ion complex that diffuses relatively quickly through the membrane. In some embodiments, ionophores are embedded in three-dimensional barrier containing ionophores 500 that form ion-ionophore complexes when exposed to the targeted ions. These ion-ionophore complexes will accelerate its diffusion within three-dimensional barrier containing ionophores 500 so that the target ion can be transported quickly. Further, the ionophores of one or more embodiments are colored ionophores, in which a chromophore and an ionophore structure are combined into a chromoionophore. A chromoionophore molecule is provided with an optical sensing function in addition to an ion-binding ability. The chromophore may be introduced at any place within the ionophore molecule. Chromoionophores can be classified into two types according to their molecular charge when they complex with ions, i.e., neutral and anionic chromoionophores. In some embodiments, ionophore-based optical sensor relies on a proton chromoionophore as signal transducer. In other embodiments, chromoionophores may be complexed with alkali or alkaline earth metal ions for example. As the complex is formed, there may be an aggregation-induced emission or an aggregation-caused quenching leading to a dramatic change in fluorescence intensity, for example. Thus, the chromoionophores of some embodiments can detect and/or quantify the presence of $Li^+$, $K^+$, $Na^+$, $Ca^{2+}$, $Fe^{2+}$, $Mg^{2+}$, $Zn^{2+}$, $Mn^{2+}$, $Pb^{2+}$, $Sr^{2+}$, $F^-$, $Cl^-$, $HS^-$, $S^{2-}$, $CO_3^{3-}$, and/or $SO_4^-$, within fluid sample 414, for example. The pH of fluid sample 414 may be measured as well using a proton ($H^+$) chromoionophore.

Further, the surface area/volume ratio of three-dimensional barrier containing ionophores 500 may be maximized to reduce diffusion time and therefore the analysis time of optical measurement tool 336 (e.g., referring to FIG. 3). Additionally, the surface area/volume ratio may be maximized by forming three-dimensional barrier containing ionophores 500, housed in cartridge 502, into a shape of a small spherical ball. Specifically, a plurality of these spherical balls may be packed within cartridge 502. It should be noted that any shape may be utilized as a form of three-dimensional barrier containing ionophores 500. For example, three-dimensional barrier containing ionophores 500 may be a bundle of fibers that may be closely packed together within three-dimensional barrier containing ionophores 500.

Accordingly, the present disclosure may provide a cartridge with a three-dimensional barrier containing ionophores disposed within the cartridge that may facilitate the analyses of water properties during a measurement operation. The methods may include any of the various features disclosed herein, including one or more of the following statements.

Statement 1. A system to separate multiphase flows in a flowline of a downhole fluid sampling and analysis tool comprising a cartridge.

Statement 2. The system of Statement 1, wherein the cartridge is a three-dimensional barrier permeable to water and repelling oil and/or drilling mud filtrate into at least one bypass channel within the flowline of the downhole fluid sampling and analysis tool.

Statement 3. The system of Statement 1 or Statement 2, wherein the cartridge is polymeric, ceramic, metallic, or any combination thereof.

Statement 4. The system of any one of Statements 1-3, wherein the cartridge comprises a polymeric three-dimensional barrier comprising an ionophore that binds to a target ion.

Statement 5. The system of any one of Statements 1-4, wherein the target ion is at least one selected from the list consisting of $Li^+$, $K^+$, $Na^+$, $Ca_2^+$, $Fe^{2+}$, $Mg^{2+}$, $Zn^{2+}$, $Mn^{2+}$, $Pb^{2+}$, $Sr^{2+}$, $F^-$, $Cl^-$, $HS^-$, $S^{2-}$, $CO_3^{3-}$, and $SO_4^{2-}$.

Statement 6. The system of any one of Statements 1-5, wherein the cartridge is a three-dimensional barrier sandwiched in between mechanical supports.

Statement 7. A system to measure ions in a water phase in an oilfield well comprising a system to separate multiphase flow in a flowline of a downhole fluid sampling and analysis tool and a sensor to measure the ions, wherein the system to separate the multiphase flow let the ions permeate through and repel the oil and/or drilling mud filtrate into at least one bypass channel within the flowline of the downhole fluid sampling and analysis tool.

Statement 8. The system of Statement 7, wherein the system to separate the multiphase flows is a cartridge which is hydrophilic, oleophobic, resistant to high temperature and high pressure, optically transparent, and promotes fast ion diffusion.

Statement 9. The system of Statement 8, wherein the cartridge is a three-dimensional barrier embedded with an ionophore that changes color upon complexation with one or more target ions and the sensor is an optical sensor.

Statement 10. The system of any one of Statements 7-9, wherein the system discriminates between formation water and injection water.

Statement 11. The system of any one of Statements 7-10, wherein the cartridge is macroporous, mesoporous, microporous, or a dense thin film.

Statement 12. The system of any one of Statements 7-11, wherein the cartridge is a three-dimensional barrier with an aperture inside the three-dimensional barrier to let a light from an optical sensor go through perpendicular to the flowline and the sensor is an optical sensor.

Statement 13. The system of any one of Statements 7-12, wherein the cartridge comprises a three-dimensional barrier sandwiched in between mechanical supports, wherein the mechanical support is metallic, ceramic, polymeric or any combination thereof.

Statement 14. The system of any one of Statements 7-13, wherein the ions react with at least one chromophore to form an ion-chromophore complex that changes the spectral characteristics of the cartridge device.

Statement 15. The system of any one of Statements 7-14, wherein the cartridge is removable and reusable.

Statement 16. A method of separating multiphase flows and measuring ions in the water phase in a downhole sampling and fluid analysis tool comprising a cartridge and a sensor, wherein the cartridge is a three-dimensional barrier permeable to water and repelling oil and/or drilling mud filtrate into at least one bypass channel within the flowline of the downhole fluid sampling and analysis tool.

Statement 17. The method of Statement 16, wherein the three-dimensional barrier has an aperture inside the three-dimensional barrier to let a light from an optical sensor go through perpendicular to the flowline and the sensor is an optical sensor.

Statement 18. The method of Statement 16 or Statement 17, wherein the cartridge is a three-dimensional barrier embedded with an ionophore that changes color upon complexation with one or more target ions and the sensor is an optical sensor.

Statement 19. The method of any one of Statements 16-18, further separating between formation water and injection water.

Statement 20. The method of any one of Statements 16-19, wherein the ions react with at least one chromophore to form an ion-chromophore complex that changes the spectral characteristics of the cartridge device.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system to separate multiphase flows in a main flowline of a downhole fluid sampling and analysis tool comprising a cartridge, wherein the cartridge is a three-dimensional barrier permeable to water and repelling oil and/or drilling mud filtrate into at least one bypass channel within the main flowline of the downhole fluid sampling and analysis tool.

2. The system of claim 1, wherein the cartridge houses a polymeric, ceramic, metallic, or any combination thereof of host material.

3. The system of claim 1, wherein the cartridge comprises a polymeric three-dimensional barrier comprising an ionophore that binds to a target ion.

4. The system of claim 3, wherein the target ion is at least one selected from a list consisting of $L^+$, $K^+$, $Na^+$, $Ca^{2+}$, $Fe^{2+}$, $Mg^{2+}$, $Zn^{2+}$, $Mn^{2+}$, $Pb^{2+}$, $Sr^{2+}$, $F^-$, $Cl^-$, $HS^-$, $S^{2-}$, $CO_3^{3-}$, and $SO_4^{2-}$.

5. The system of claim 1, wherein the cartridge is a three-dimensional barrier sandwiched in between mechanical supports.

6. A system to measure ions in a water phase in an oilfield well comprising a system to separate multiphase flow in a main flowline of a downhole fluid sampling and analysis tool and a sensor to measure the ions, wherein the system to separate the multiphase flow comprises of a cartridge, the cartridge is a three-dimensional barrier that lets the ions permeate through and repels oil and/or drilling mud filtrate into at least one bypass channel within the main flowline of the downhole fluid sampling and analysis tool.

7. The system of claim 6, wherein the system to separate the multiphase flows is a cartridge which is hydrophilic, oleophobic, resistant to high temperature and high pressure, optically transparent, and promotes fast ion diffusion.

8. The system of claim 7, wherein the cartridge comprises a three-dimensional barrier embedded with an ionophore that changes color upon complexation with one or more target ions and the sensor is an optical sensor.

9. The system of claim 6, wherein the system discriminates between formation water and injection water.

10. The system of claim 7, wherein the cartridge is macroporous, mesoporous, microporous, or a dense thin film.

11. The system of claim 7, wherein the cartridge is a three-dimensional barrier with an aperture inside the three-dimensional barrier to let a light from an optical sensor go through perpendicular to the flowline and the sensor is an optical sensor.

12. The system of claim 7, wherein the cartridge comprises a three-dimensional barrier sandwiched in between mechanical supports, wherein the mechanical supports are metallic, ceramic, polymeric, or any combination thereof.

13. The system of claim 7, wherein the target ions react with at least one chromophore to form an ion-chromophore complex that changes the spectral characteristics of the cartridge.

14. The system of claim 7, wherein the cartridge is removable and reusable.

15. A method of separating multiphase flows and measuring ions in a water phase in a downhole fluid sampling and analysis tool comprising a cartridge and a sensor, wherein the cartridge is a three-dimensional barrier permeable to water and repelling oil and/or drilling mud filtrate into at least one bypass channel within a main flowline of the downhole fluid sampling and analysis tool.

16. The method of claim 15, wherein the three-dimensional barrier has an aperture inside the three-dimensional barrier to let a light from an optical sensor go through perpendicular to the flowline and the sensor is an optical sensor.

17. The method of claim 15, wherein the cartridge is a three-dimensional barrier embedded with an ionophore that changes color upon complexation with one or more target ions and the sensor is an optical sensor.

18. The method of claim 15, further separating between formation water and injection water.

19. The method of claim 15, wherein the ions react with at least one chromophore to form an ion-chromophore complex that changes the spectral characteristics of the cartridge.

* * * * *